United States Patent Office 2,951,855
Patented Sept. 6, 1960

2,951,855

DYE CYANIDES

Lyman Chalkley, Prince Georges County, Md.
(5320 Middleton Lane, Washington 22, D.C.)

No Drawing. Filed Aug. 28, 1958, Ser. No. 757,689

7 Claims. (Cl. 260—388)

The invention relates to new dye cyanides for use in preparation of photosensitive materials. More particularly, the invention relates to substituted diaminotriarylacetonitriles having the following general formula:

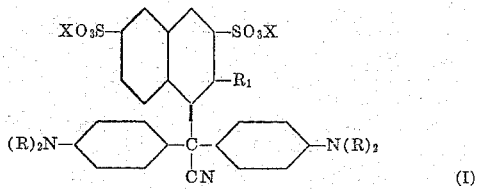

(I)

wherein R is a radical selected from the group consisting of methyl and ethyl, $R_1$ is a radical selected from the group consisting of hydrogen and hydroxyl, and X is a cation.

The sulfonic acid groups of the compounds of the general formula given above are highly ionized salt-forming radicals. The essential part of the dye cyanide compounds containing this group comprises the ion $RSO_3^-$, R in this instance representing the diaminotriarylacetonitrile portion of the ion. This ion, because of its strongly hydrophilic character, confers hydrophilic properties upon the triarylacetonitrile compound. However, the ion alone, of course, does not constitute the complete neutral molecule and, therefore, the sulfonic ion is always combined with an ion of opposite charge in a complete molecule. Thus, the sulfonic ion is combined with a cation, which may be hydrogen or a metal ion, or ammonium.

The nature of the cation with which the sulfonic ion is combined is not at all critical. In systems in which the new compounds are photosensitive, the sulfonic acid groups are largely ionized and the cation is no longer even a part of the molecule under the conditions in which the compounds are utilized to take advantage of their photosensitive properties. Therefore, any cation may be used with the sulfonic acid groups for preparation of a satisfactory photosensitive hydrophilic dye cyanide.

For matters of convenience, selected ions are usually combined with the sulfonic groups. Thus, the sulfonic acid salts are generally more soluble in water than the free acid. Useful salts are those of sodium, potassium, calcium, strontium, and barium.

It is the object of the present invention to provide new hydrophilic dye cyanides which in the presence of a suitable activator, will form a colored compound on exposure to ultraviolet and shorter wave length radiation.

Another object of the invention is to provide new hydrophilic dye cyanides which can be utilized as sensitizers for printing papers and the like, to provide materials which possess a high-temperature coefficient of photochemical reaction, i.e., which are much more sensitive to ultraviolet and shorter wave length radiation at elevated temperatures than at room temperatures.

The new dye cyanide compounds may be prepared by reacting the corresponding dyes with an ionizable cyanide, such as sodium cyanide, in an aqueous solution and then isolating the reaction product either in free acid form or in salt form. Thus, the dye formerly known as Naphthalene Green V and identified in the second edition of Colour Index (1957), vol. 3, page 3376, as C.I. Acid Green 16 (Colour Index 44025), may be utilized as a starting material for the production of a dye cyanide of the general Formula I above, wherein R is methyl or ethyl and $R_1$ is hydrogen. Likewise, the dye formerly known as Wool Green S and identified in the second edition of Colour Index (1957), vol. 3, page 3378, as C.I. Acid Green 50 (Colour Index 44090), may be utilized as a starting material for the production of a dye cyanide of the general Formula I above, wherein R is methyl and $R_1$ is hydroxyl.

The new compounds are substantially colorless and like the hydrophilic dye cyanides disclosed in my copending application Serial No. 542,479, filed October 24, 1955 (now Patent No. 2,855,303, granted October 7, 1958), are photosensitive to ultraviolet and shorter wave lengths in the presence of water or hydrocolloids to form colored compounds. However, the compounds of the present invention, unlike those previously known, have the unique property of possessing a high-temperature coefficient of photochemical reaction. Thus, as disclosed in my copending application Serial No. 752,535, filed August 1, 1958, photosensitive sheet materials produced from such compounds may have a relatively slow printing speed at room temperature, but when the temperature is high, i.e., 70° C. to 160° C., have over ten times such printing speed. The photosensitive material can, therefore, be printed while hot and then cooled to room temperature, thereby reducing the sensitivity of the print so that the unexposed portion will not fog in ordinary use.

The preparation of the new compounds is illustrated by the following examples of practice:

EXAMPLE I

*Preparation of the cyanide of C.I. Acid Green 16—Colour Index 44025 (Naphthalene Green V cyanide)*

To a solution of 100 g. of Pontacyl Green NV Extra (E. I. du Pont de Nemours & Co. brand of Naphthalene Green V) in 500 ml. of water at 80° C. is added a solution of 28 g. of 97% sodium cyanide in 60 ml. of water and the mixture stirred well and allowed to cool to 25° C. by standing at room temperature for 12 hours. To the clear reaction solution is added 1200 ml. of a saturated aqueous solution of sodium chloride, and the mixture allowed to stand over night. The upper clear aqueous layer is then decanted from the heavy viscous material that has precipitated on the bottom and walls of the reaction flask or vessel. The decanted solution is discarded. The viscous precipitate is washed with 50 ml. of saturated sodium chloride solution, which also is discarded. The precipitate is then dissolved at room temperature by stirring with 200 ml. of fresh water, and the solution filtered. To the filtrate is added 175 ml. of normal hydrochloric acid, and the mixture allowed to stand at 25° C. for 48 hours or until crystallization, which sometimes is slow to start, has taken place. The crystalline precipitate is collected on a filter, washed with 50 ml. of ice water, and dried in a vacuum desiccator over sulfuric acid. The crude Naphthalene Green V cyanide is purified by recrystallization from 200 times its weight of water.

The product produced is the free acid form of the dye cyanide having the formula

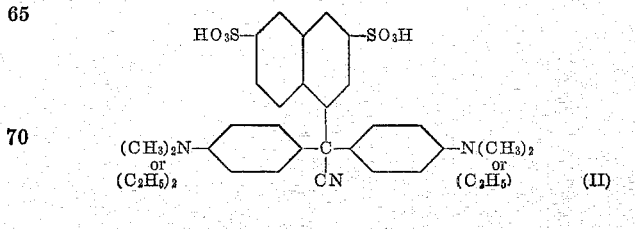

(II)

Salts of the compound may be prepared by reacting the free acid (Formula II) with a suitable alkali, ammonium or alkaline earth metal compound. Thus, to produce the disodium salt, the compound of Formula II may be neutralized by dissolving it in a solution of sodium carbonate or sodium hydroxide.

EXAMPLE II

*Preparation of the cyanide of C.I. Acid Green 50—Colour Index 44090 (Wool Green S cyanide)*

To a solution of 25 g. of Kiton Green S conc., manufactured by the Ciba Company, in 125 ml. of water at 70° C. is added a solution of 6.5 g. of 97% sodium cyanide in 25 ml. of water. The flask containing the resulting solution is closed and heated at 85° C. for 1 hour, during which time the deep blue color fades. The solution then is cooled to 25° C. and filtered from a little precipitate, which is discarded. To the filtrate is added an equal volume of saturated sodium chloride solution, and the mixture allowed to stand over night. The resulting precipitate is collected on a filter, washed with saturated sodium chloride solution and dried in an oven at 100° C. The dry product is dissolved in 135 ml. of warm water. To this solution is added 4 ml. of concentrated hydrochloric acid. The mixture is cooled to 0° C. and held at this temperature for four days, or until crystallization takes place. The precipitate is collected on a filter, washed with 20 ml. of ice water, and dried in a vacuum desiccator over sulfuric acid.

The product is the free acid form of the dye cyanide having the formula

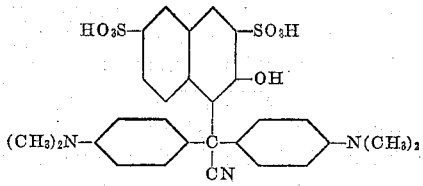

(III)

Salts of this compound may be produced by the method given above with respect to the product of Example I.

I claim:

1. A dye cyanide having the formula:

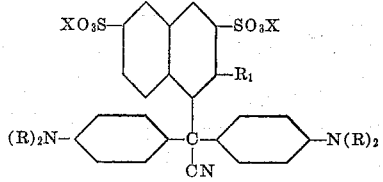

wherein R is a lower radical, $R_1$ is a radical selected from the group consisting of hydrogen and hydroxyl, and X is a cation.

2. A dye cyanide, as defined in claim 1, wherein R is methyl and $R_1$ is hydrogen.

3. A dye cyanide, as defined in claim 1, wherein R is ethyl and $R_1$ is hydrogen.

4. A dye cyanide, as defined in claim 1, wherein R is methyl, $R_1$ is hydrogen, and X is hydrogen.

5. A dye cyanide, as defined in claim 1, wherein R is ethyl, $R_1$ is hydrogen, and X is hydrogen.

6. A dye cyanide, as defined in claim 1, wherein R is methyl and $R_1$ is —OH.

7. A dye cyanide having the formula:

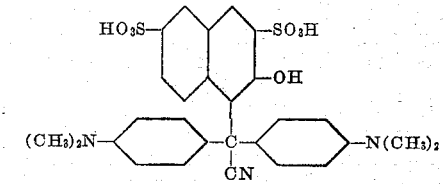

References Cited in the file of this patent

UNITED STATES PATENTS

| | | |
|---|---|---|
| 1,938,014 | Francke | Dec. 5, 1933 |
| 2,366,179 | Chalkley | Jan. 2, 1945 |
| 2,441,561 | Chalkley | May 18, 1948 |
| 2,855,303 | Chalkley | Oct. 7, 1958 |

UNITED STATES PATENT OFFICE
CERTIFICATE OF CORRECTION

Patent No. 2,951,855　　　　　　　　　　September 6, 1960

Lyman Chalkley

It is hereby certified that error appears in the printed specification of the above numbered patent requiring correction and that the said Letters Patent should read as corrected below.

Column 4, line 13, after "lower" insert -- alkyl --.

Signed and sealed this 4th day of April 1961.

(SEAL)
Attest:　　ERNEST W. SWIDER

Attesting Officer

ARTHUR W. CROCKER
Acting Commissioner of Patents